May 11, 1926.
B. REHM
1,583,797
MITER CUTTING MACHINE
Filed May 13, 1924
2 Sheets-Sheet 2
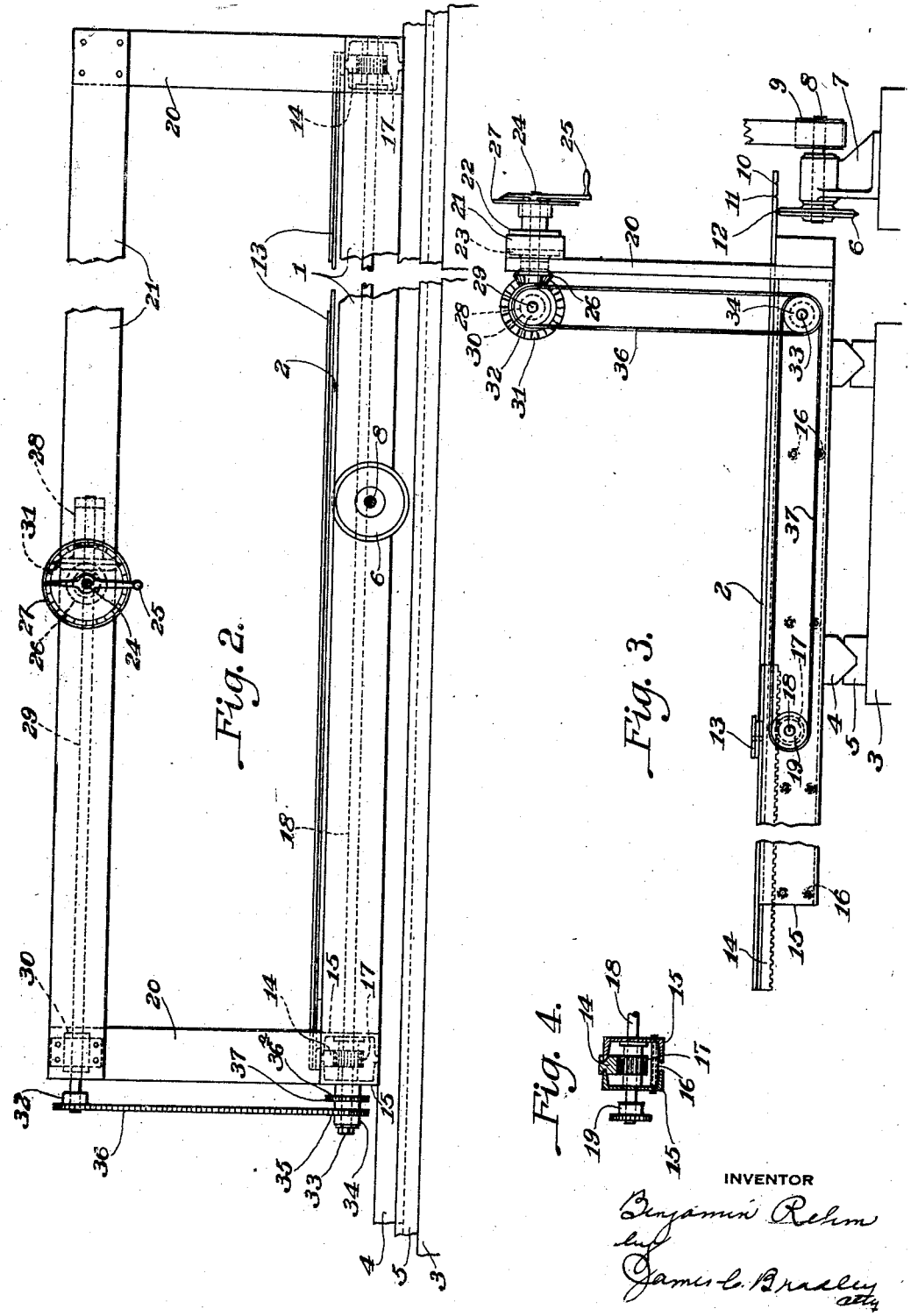
INVENTOR
Benjamin Rehm
by
James C. Bradley
atty Patented May 11, 1926.

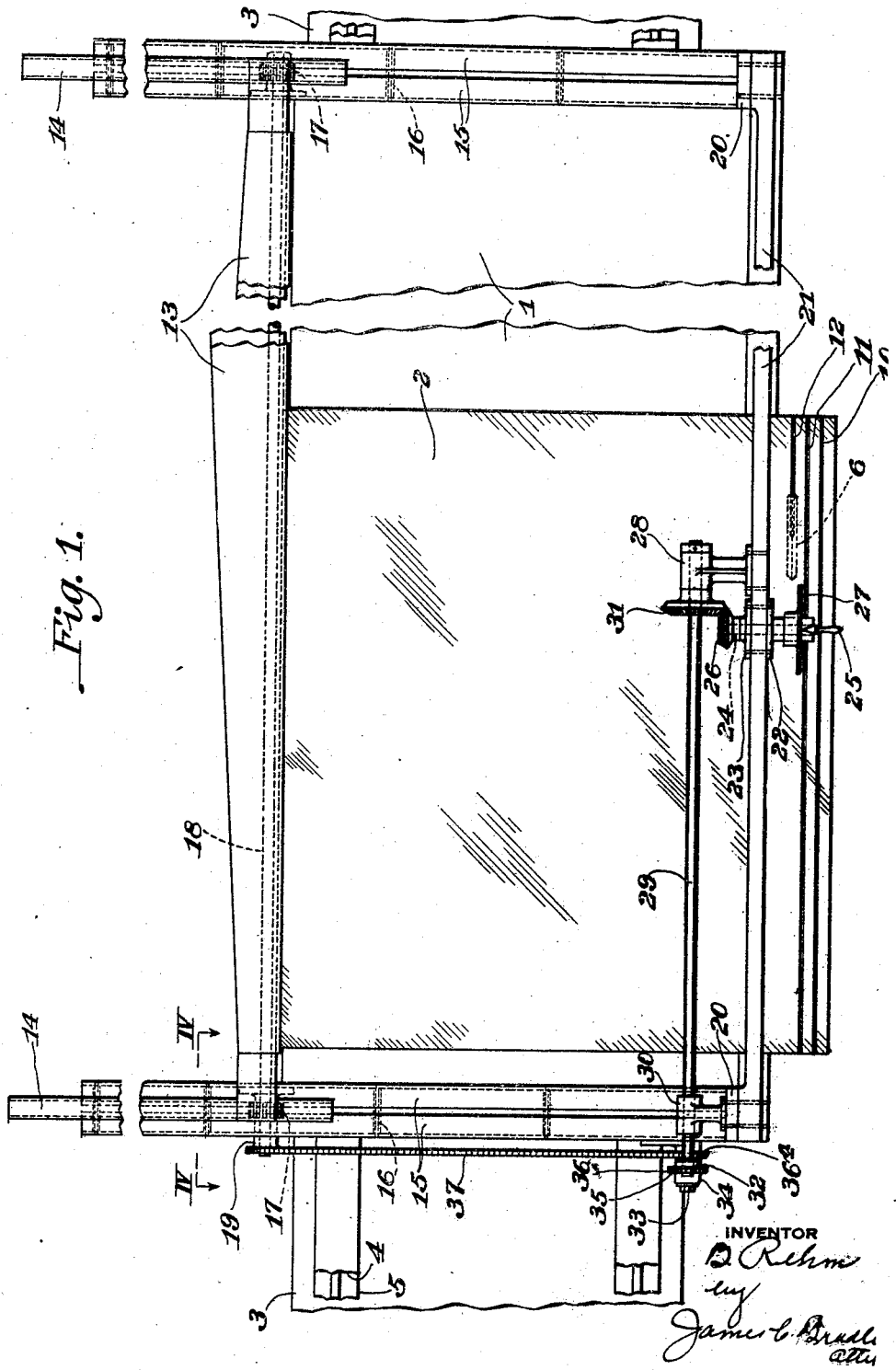

1,583,797

UNITED STATES PATENT OFFICE.

BENJAMIN REHM, OF CRYSTAL CITY, MISSOURI, ASSIGNOR TO PITTSBURGH PLATE GLASS COMPANY, A CORPORATION OF PENNSYLVANIA.

MITER-CUTTING MACHINE.

Application filed May 13, 1924. Serial No. 713,079.

The invention relates to apparatus for cutting miters or grooves in sheet glass, such as is ordinarily done adjacent the edges of the sheet for the purpose of ornamentation, and particularly to the means for positioning the edge of the sheet on the movable table with respect to the grooving wheel. The invention has for its objects the provision of improved means for positioning the sheet so that such edge is in parallelism with the line of cut of the wheel, and is so maintained for successive cuts, and for adjusting the sheet with exactness for the succeeding cuts with a minimum expenditure of time and effort. One embodiment of the invention is illustrated in the accompanying drawings wherein:

Figure 1 is a plan view of the machine with a part of the table broken away to shorten the view. Fig. 2 is a front elevation. Fig. 3 is an end elevation. And Fig. 4 is a section on the line IV—IV of Fig. 1.

The table 1 which carries the sheet of glass 2 whose edge is to be grooved is mounted for reciprocating movement along the bed 3, suitable guides 4 and 5 being employed as indicated in Fig. 3. The cutting wheel 6 is of the usual type mounted opposite the front side of the table and supported in a suitable standard 7. The shaft 8 is provided with a pulley 9 driven from suitable mechanism, not shown. The means for reciprocating the table is also not shown as this has nothing to do with the present invention, but one form for accomplishing this function is illustrated and described in my co-pending application, Serial Number 650,125, filed July 7, 1923. During the cutting operation, the glass sheet 2 is pressed down against the table adjacent the front edge of the machine by suitable clamping devices. These clamping devices also consitute no part of the present invention, but are illustrated and described in said application. In operation, it will be understood that the table reciprocates back and forth over the cutting wheel until the desired number of grooves are cut, two of such grooves 10 and 11 being illustrated as completed in sheet 2 (Fig. 1), while a third groove 12 is being cut as the table moves to the right.

Extending lengthwise of the table along its rear side is the straight edge 13 which engages the rear edge of the glass sheet 2 and maintains it in proper position and also serves to adjust it forwardly intermediate the successive cuts 10, 11 and 12. This straight edge is guided in its movement toward the cutting wheel by means of a pair of rack bars 14, to which the ends of the straight edge are secured. These rack bars are mounted as indicated in Fig. 4, being of the I shaped cross section illustrated and being held between the upper edges of the channels 15, 15, which constitute the framework of the table 1, at each end thereof. These channel bars are rigidly secured to the wood body of the table and are maintained in their proper relative positions by means of suitable spacing tubes 16 arranged at intervals along their length as indicated in dotted lines in Figs. 1 and 3. The lower sides of the bars 14, 14 are provided with racks which are engaged by the pinions 17, 17 carried by the shaft 18, such shaft being supported in suitable bearings carried by the channel irons 15, 15. A sprocket wheel 19 is mounted upon one end of the shaft 18 and operated from the setting device as hereinafter set forth.

Secured rigidly to the ends of the table 1 at the front side thereof are the upright bars 20, 20 connected together at their upper ends by the horizontal bar 21, the three bars together constituing a supporting frame for the setting device which governs the movements of the straight edge 13. About midway of the bar 21 are a pair of brackets 22, 23 and 28 mounted upon the front and rear sides of the bar respectively and serving as a bearing for the shaft 24 and for one end of the shaft 29. This shaft extends along the rear side of the bar 21 to the left hand end thereof (Fig. 1) where it is supported in another bearing bracket 30 secured to the rear side of the upright bar 20. The shaft 29 carries a bevel gear 31 meshing with the gear 26.

The end of the shaft 29 is provided with a sprocket wheel 32 and immediately below this sprocket wheel and mounted upon a shaft 33 projecting from the end of the table is on idler 34 provided with a pair of sprocket gears 35 and 36ª. The gear 35 is driven from the sprocket wheel 32 by means of the chain 36, while a second sprocket chain 37 provides a drive intermediate the sprocket wheels 36ª and 19. In this manner, any rotary movement of the shaft 24 carrying the setting handle 25 is transmitted to the shaft 18, thus causing a movement of the rack bars 14 and the straight edge 13 carried thereby.

The dial 27 is calibrated so that the sheet of glass 2 may be set forward a known and definite amount by moving the pointer of the setting handle over a known segment of the dial. After one groove has been cut in the edge of the sheet 2 and it is desired to cut a second groove at a given distance from it, all that is necessary is to rotate the setting handle the requisite amount, which moves the straight edge inward the desired amount, and carries the outer edge of the sheet to the proper position for the next cut. The adjustment of the sheet is thus made with exactness for each cut and the straight edge holds the sheet against any twisting movement, so that the various lines of cut are made parallel. The mounting of the setting device upon the horizontal rail 21 positions it where it is most readily accessible for convenient operation, and at the same time, the frame and setting device leave the front side of the machine unobstructed so that there is no interference with the clamping devices which are applied along the edge of the sheet beneath the rail 21. Other advantages incident to the construction will be readily apparent to those skilled in the art.

What I claim is:

1. In combination in a machine for cutting miters in glass sheets, a cutting wheel and table for the glass sheet mounted for relative movement in a horizontal direction, a straight edge for engaging the edge of the sheet remote from the edge of the table along which the cut is to be made, guided upon such table for movement at right angles to the line of cut, gearing for adjusting the straight edge toward the cutting wheel, a setting device at the front of the machine and actuating connections between such device and said gearing.

2. In combination in a machine for cutting miters in glass sheets, a cutting wheel and table for the glass sheet mounted for relative movement in a horizontal direction, a straight edge for engaging the edge of the sheet remote from the edge of the table along which the cut is to be made guided upon such table for movement at right angles to the line of cut, a gear device at each end of the straight edge for adjusting it toward the cutting wheel, a setting device at the front of the machines, and actuating connections between such device and both of said gear devices.

3. In combination in a machine for cutting miters in glass sheets, a cutting wheel and table for the glass sheet mounted for relative movement in a horizontal direction, a straight edge for engaging the edge of the sheet remote from the edge of the table along which the cut is to be made guided for movement at right angles to the line of cut, a rack bar at each end of the straight edge, a shaft provided with pinions at its ends engaging the rack bars, a setting device at the front of the machine, and actuating gearing between the setting device and said shaft.

4. In combination in a machine for cutting miters in glass sheets, a cutting wheel and table for the glass sheet mounted for relative movement in a horizontal direction, a straight edge carried by the table in parallelism with the front edge thereof and guided for movement toward and from the cutting wheel, gear devices for adjusting the straight edge, a framework carried by the table and comprising a pair of upright bars at the ends thereof adjacent its front side, and a horizontal bar connecting the upper end of such pair of bars, a setting device carried by said horizontal bar, and operating connections between the setting device and said gear devices.

5. In combination in a machine for cutting miters in glass sheets, a cutting wheel and table for the glass sheet mounted for relative movement in a horizontal direction, a straight edge carried by the table in parallelism with the front edge thereof and guided for movement toward and from the cutting wheel, a rack bar secured to each end of the straight edge, a shaft provided with pinions at its ends engaging the rack bars, a framework carried by the table and comprising a pair of upright bars at the ends thereof adjacent its front side and a horizontal bar connecting the upper ends of said pair of bars, a setting device carried by the horizontal bar, and operating connections between the setting device and said shaft, said operating connections including a shaft extending along the back of the horizontal bar and sprocket chain connections between the end of such shaft and the shaft carrying the pinions.

In testimony whereof, I have hereunto subscribed my name this 25th day of April, 1924.

BENJAMIN REHM.